Dec. 27, 1955
J. R. OISHEI
2,728,100
SNOW BLADE
Filed Dec. 3, 1951
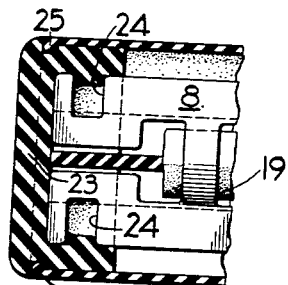
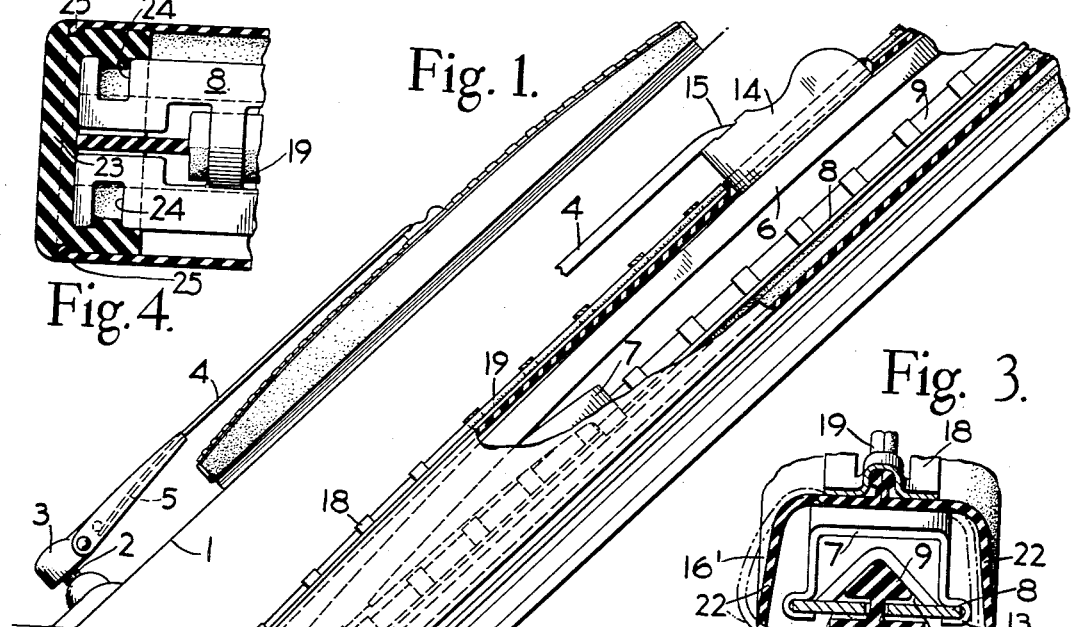
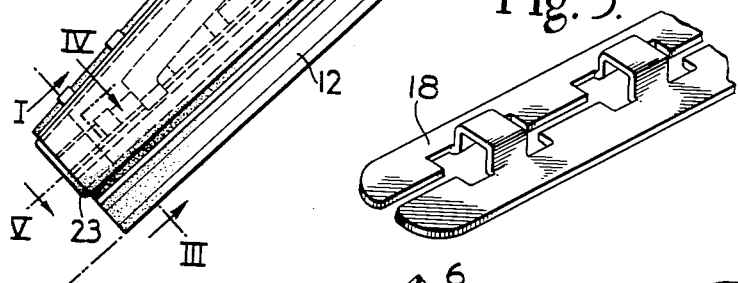
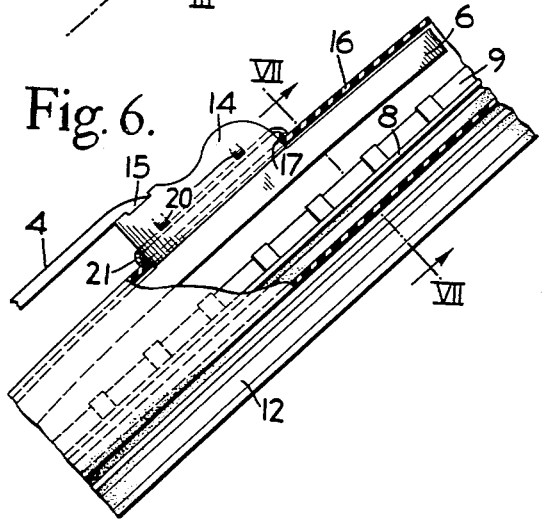
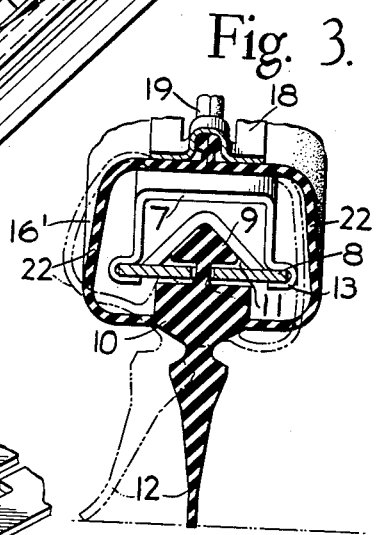
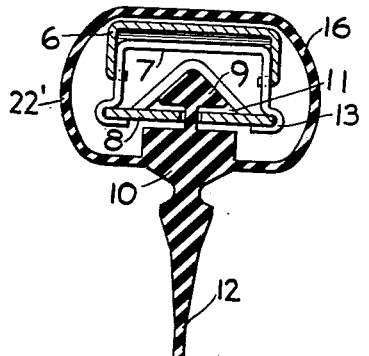
INVENTOR.
JOHN R. OISHEI
BY
Bean, Brooks, Buckley & Bean
ATTORNEYS

United States Patent Office 2,728,100
Patented Dec. 27, 1955

2,728,100

SNOW BLADE

John R. Oishei, Buffalo, N. Y., assignor to Trico Products Corporation, Buffalo, N. Y.

Application December 3, 1951, Serial No. 259,593

11 Claims. (Cl. 15—245)

This invention relates to the windshield cleaning art and more particularly to the wiper or blade that is reciprocated on the windshield to clean a field of vision therethrough.

The present day curved windshield has a variable surface contour changing from a substantially flat frontal area, directly in front of the driver for forward vision, to lateral areas of more or less sharp curvatures and necessitating the use of a flexible wiping blade which has a pressure-distributing superstructure for enforcing surface-conformance upon the blade to insure its edge making wiping contact with the glass. The superstructure is generally composed of flexibly connected parts through which the spring pressure of the wiper actuating arm is distributed at points along the length of the blade for providing the desired pressure in the wiping contact. To facilitate a practical application of the arm pressure it is vital to maintain the parts of the superstructure freely responsive to the spring urge of the arm. However, these parts are exposed to the weather and are subject to becoming clogged by wet snow, and even freezing immovable, to impair if not defeat the purpose of the superstructure by rendering the blade rigid and useless for wiping a surface area of variable contour.

An important object of this invention is to provide a winter blade of simple and practical design by which the efficiency of its supporting superstructure is maintained during inclement weather.

Again, the invention has for its object to provide a wiper for cleaning curved windshields having vision areas of blended different radii, the wiper incorporating a built-in surface-conforming frame that is fully inclosed and protected from the weather to maintain it freely flexible for proper performance.

Further, the invention will be found in a blade having a weather bonnet which provides a compartment for receiving and inclosing the pressure distributing frame, the walls of the bonnet flexing during operation to dislodge ice and other congealed deposit therefrom that might otherwise impair its wiping efficiency.

The foregoing and other objects will manifest themselves as this description progresses, reference being made therein to the accompanying drawing wherein Fig. 1 is a side elevation of a wiper incorporating the present invention and mounted upon an actuating arm;

Fig. 2 is a like view enlarged and broken away to better disclose its structure;

Fig. 3 is a transverse sectional showing about on line 3—3 of Fig. 2;

Fig. 4 is a fragmentary sectional view about on the longitudinal plane indicated by the line 4—4 of Fig. 2;

Fig. 5 is a fragmentary view in perspective of the fastening clip;

Fig. 6 is a fragmentary view similar to Fig. 2 of a modification; and

Fig. 7 is a cross section thereof about on line 7—7 of Fig. 6.

Referring more particularly to the drawing, there is depicted in Fig. 1 a windshield surface 1, either flat, curved, or a combination of the two and with varying degrees of curvature. An oscillatory shaft 2, suitably powered, is journaled at the bottom of the windshield and mounts a wiper actuating arm having an inner mounting section 3 and an outer wiper-carrying section 4 pivotally connected thereto and acting under the urge of its spring 5 to apply a wiping pressure to the wiper, all in a well known manner.

While any suitable wiper may be employed, the one illustrated comprises a blade or squeegee member and its holding superstructure, the latter being in the form of a pressure-distributing frame having a primary yoke or bridge 6, secondary yokes or rockers 7, one for each end of the primary pivotally or rockably connected thereto, and a flexible base or holder 8 that slidably ties together the two secondaries in a manner to enable either pivoting independently of the other while serving to support them against lateral twisting from a coplanar relationship with each other as well as with the primary. The blade has an anchoring bead 9, extending lengthwise of a heavier body portion 10 for slidable reception by the channel 11 of the holder 8, and a flexible wiping edge 12. The opposite ends of the secondaries straddle the holder and slidably embrace the opposite side margins thereof to support it from rotational displacement about its longitudinal axis. The channeled holder has greater width than thickness and is designed for flexing into surface conformance while affording lateral rigidity and stability for the blade between the four points of sliding interlock with the opposite ends of the secondaries as provided by the opposing fingers or jaws 13. The holder in effect constitutes a flexible backing for the blade. This wiper construction forms the subject matter of an earlier application Serial No. 161,086, now Patent No. 2,687,544.

As the wiper is oscillated over a surface of varying contour the parts of the pressure-distributing superstructure will rock and move relative to each other and exert a surface-comforming pressure on the flexible holder or backing to compel the wiping edge 12 to follow the surface contour in wiping contact. The primary bridge 6 has an arm-attaching clip 14 for slidably receiving the curved terminal 15 of the arm 3, 4 to enable the wiper adjusting itself squarely upon the windshield glass. During their surface-conforming and pressure-distributing action the yokes and backing will nest more or less. It is therefore necessary that sufficient clearance be maintained at all times between the parts of the frame to insure their required freedom of movement. Consequently, any packing of snow in or between the parts will restrict and hinder if not obstruct this freedom. Furthermore, where the parts are exposed it is possible for snow or other accumulation to gather in the holder channel 11, or in between the body portion 10 and its overlying holder, and obstruct the desired free floating movement of the blade in its support.

The present invention is to preclude circumstances, such as the foregoing, arising to impair the wiper's efficiency. To this end, there is provided a weather bonnet or envelope 16 to inclose the superstructure or frame and to keep out moisture which could freeze to the detriment of the wiper. The bonnet may assume the form of a sleeve, Fig. 6, being tapered toward its opposite ends, to accommodate the generally pyramidal shape of the pressure distributing frame, and provided with a medial neck opening 17 to snugly fit about the otherwise exposed arm-attaching clip 14. Or, the bonnet 16', Figs. 1–5, may be opened along its back and normally held closed by a pair of alined clamps 18 slidably engaged beneath and over the abutting marginal beads 19 by a telescopic fit. The clamps may be squeezed or otherwise deformed to secure them from lengthwise displacement. The continuous sides of the clamp will afford substantial lateral support for the back of the bonnet and adjacent the arm-attaching clip will serve to secure it to the primary yoke for following it during its surface-conforming motion. This securement may be also effected by one or more catches 20 struck out from the clip 14 to overhang neck bead 17, or a metallic clamping collar 21 on the bonnet. The securement may be carried out for the entire length of the primary yoke.

During operation, the back wall of the bonnet will respond somewhat to and follow the up and down movement of the primary yoke relative to the flexible backing. The side walls 22 of the bonnet will buckle and distend alternately for breaking the adhesion of any ice thereto to dislodge the deposit. This buckling of the bonnet will be augmented by a rotational distortion incidental to the anchorage of the bonnet, as shown in Figs. 3 and 7, wherein the bonnet is attached to the swinging blade body 10 that moves wtih the wiping edge 12 as the latter assumes its rearwardly inclined wiping position at the start of each wiping stroke. The bonnet freely receives the superstructure with sufficient clearance thereabout to afford the required freedom of flexure for following changes in surface-contour. The side walls are normally spaced outwardly from the superstructure to avoid binding contact with the parts thereof. This insures a normal pressure-distributing functioning of the frame as well as an independent rotational motion of the bonnet that is restrained only at the points of attachment thereto. The side walls may incorporate an accordion or other fold 22' as depicted in Fig. 7, to provide sufficient slack to assure the blade-impelled rotational motion of the bonnet.

While attachment may be made detachable, as by separable fasteners, it is preferred to mold the bonnet integrally with the blade, to be mounted and demounted as a unit therewith upon the pressure-distributing frame. This mode of attachment provides an effective enclosure about the relatively movable parts of the frame which precludes the snow packing into the channel 11 and between the body and its flexible backing 8.

The ends of the tubular bonnet may be closed by end walls integral therewith when the bonnet has an openable back, as in Fig. 3, but preferably a simple closure plug 23, Fig. 4, is inserted. The plug is suitably secured in place, as by having it interlocked in recesses 24 of the flexible backing, or it may be interlocked directly with the bonnet as indicated at 25, by a rib on the bonnet engaging a groove on the plug. The removal of the plug will enable placement of the collapsible pressure applying frame 6, 7, 8 by endwise introduction of the frame into the tubular bonnet.

The blade may be properly termed a snow blade since it precludes the entrance of snow between the parts of the flexible surface-conforming superstructure so as to enable the latter functioning under normal conditions in all kinds of weather. The weather bonnet is self-cleaning of any hindering icy coating thereby serving to maintain the wiper in a performing state. It is practical in design, the blade element, with its bonnet, being demountable for replacement by a summer blade, if desired. The bonnet is of simple construction and functions without hindering efficient windshield cleaning performance. The flexible backing serves to make the superstructure in the nature of a spring frame which collapses somewhat during its surface-conforming action.

The foregoing detailed description has been given for ease of understanding and without thought of limitation since the inventive principles involved are capable of assuming other embodiments without departing from the spirit of the invention and the scope of the appended claims.

What is claimed is:

1. A windshield wiper comprising a flexible blade conformable to a surface for wiping contact therewith, a pressure-distributing frame having pivotally connected parts operable to fold and unfold in distributing a surface-conforming and wiping pressure to the blade, and a weather bonnet inclosing the frame and connected to the blade, said bonnet having loose walls on opposite sides of the foldable parts and free thereof for buckling and distending during such folding and unfolding of the frame, said bonnet walls being relatively thin and more flexible than the blade.

2. A windshield wiper comprising a flexible blade, a flexible backing therefore interengaged therewith for surface-conforming flexure, an elongate bridge having an arm attaching clip medial of its length, a rockable holder for each end of the bridge pivoted thereto, said backing slidably connecting the two rockers, and a weather bonnet inclosing the backing, the holders and bridge, the bonnet having side walls free of the rockable holders for buckling and distending as the holders rock in conforming the blade to changes in surface contour.

3. A wiper for curved windshields, comprising a flexible blade having a wiping edge along one longitudinal margin and a tubular weather bonnet overhanging its opposite margin and having a chamber for the reception of a blade-mounting surface-conforming superstructure, the opposite margin being in the form of an anchoring bead extending longitudinally within the tubular bonnet and upstanding within the chamber and inwardly of the wall thereof.

4. An article of manufacture comprising a molded one-piece windshield wiping blade having a wiping edge along one longitudinal margin and an anchoring bead along its opposite margin, with a tubular weather bonnet overhanging the bead for the reception of a blade-mounting surface-conforming superstructure, said tubular bonnet being integral with and extending from the opposite sides of the blade beneath the anchoring bead.

5. A wiper for curved windshields, comprising a flexible blade body having a laterally flexible wiping edge along one longitudinal margin and a tubular weather bonnet attached to the opposite sides of the body, and the opposite margin of the blade body being in the form of a longitudinally extending anchoring bead within the bonnet hinged to the body above the bonnet attachment thereto and engageable with a bonnet-received pressure distributing frame.

6. A wiper for curved windshields, comprising a flexible blade having a wiping edge along one longitudinal margin, a collapsible spring frame detachably supporting the blade along its opposite margin for conforming the blade to the surface contour being wiped, and a weather bonnet inclosing the spring frame and having side walls spaced loosely from the latter, said bonnet having an opening giving access to the frame to enable its detachment from the blade.

7. A wiper for curved windshields, comprising a flexible blade having a wiping edge along one longitudinal margin, and its opposite margin provided with hinge means for engaging a surface-conforming superstructure, and a weather bonnet for such superstructure connected to the opposite sides of the blade between its margins and extending out over said opposite margin, said bonnet being divided lengthwise over said opposite margin to facilitate such engagement and having means to secure the divided parts together.

8. A windshield wiper comprising a flexible blade having an anchoring part along one margin and a wiping portion hinged thereto for lateral swinging, a pressure applying frame of pivotally connected members collapsible upon and extensible from the blade in conforming it to the surface contour being wiped, said frame engaged with said anchoring part, and a weather bonnet for the frame freely inclosing the same with clearance thereabout and anchored to the opposite sides of the wiping portion for being rotated thereby about the frame as the wiping portion hinges back and forth.

9. A windshield wiper comprising a flexible blade having an anchoring part along one margin and a wiping portion hinged thereto for lateral swinging, an open spring frame of relatively movable members collapsible to conform the blade to the surface contour being wiped, said frame engaged with said anchoring part, and a tubular weather bonnet receiving the collapsible frame and having buckling side walls extending loosely out over and about the frame to inclose the same, said frame folding and unfolding during surface-conforming action and acting on the bonnet to expand and contract the same.

10. A windshield wiper comprising a flexible blade having an anchoring part along one margin and a wiping portion hinged thereto for lateral swinging, an open spring frame of relatively movable members collapsible to conform the blade to the surface contour being wiped, said frame engaged with said anchoring part, and a tubular weather bonnet receiving the collapsible frame and having buckling side walls extending loosely out over and about the frame to inclose the same, said frame folding and unfolding during surface-conforming action and acting on the bonnet to expand and contract the same, one end of the bonnet being open to facilitate the placement of the frame therein, and a closure plug removably engaged in the open end of the bonnet.

11. A windshield wiper comprising a flexible blade having an anchoring part along one margin and a wiping portion hinged thereto for lateral swinging, an open spring frame of relatively movable members collapsible to conform the blade to the surface contour being wiped, said frame engaged with said anchoring part, and a tubular weather bonnet receiving the collapsible frame and having buckling side walls extending loosely out over and about the frame to inclose the same, said frame folding and unfolding during surface-conforming action and acting on the bonnet to expand and contract the same, one end of the bonnet being open to enable endwise placement of the frame into the tubular bonnet, and a closure for the open end of the bonnet detachably engaged through such open end with the frame for securing it in place.

References Cited in the file of this patent

UNITED STATES PATENTS

| | | |
|---|---|---|
| 2,141,023 | Ryan | Dec. 20, 1938 |
| 2,232,356 | Abdelnour | Feb. 18, 1941 |
| 2,543,383 | Scinta et al. | Feb. 27, 1951 |
| 2,583,710 | Scinta | Jan. 29, 1952 |
| 2,596,063 | Anderson | May 6, 1952 |